United States Patent
Azizi et al.

(10) Patent No.: US 8,024,927 B1
(45) Date of Patent: Sep. 27, 2011

(54) SYSTEM FOR BUOYANCY POWER GENERATION

(76) Inventors: S. Massoud Azizi, Northridge, CA (US); Kourosh Kia Azizi, Northridge, CA (US)

(*) Notice: Subject to any disclaimer, the term of this patent is extended or adjusted under 35 U.S.C. 154(b) by 0 days.

(21) Appl. No.: 12/931,914

(22) Filed: Feb. 15, 2011

Related U.S. Application Data

(63) Continuation-in-part of application No. 12/924,975, filed on Oct. 12, 2010, now abandoned.

(51) Int. Cl.
*F03B 17/02* (2006.01)
*F03G 7/08* (2006.01)

(52) U.S. Cl. ............ 60/496; 60/495; 290/1 R

(58) Field of Classification Search ........ 60/495, 60/496; 290/1 R
See application file for complete search history.

(56) References Cited

U.S. PATENT DOCUMENTS

| | | | |
|---|---|---|---|
| 2,129,292 A * | 9/1938 | Vinson | 417/329 |
| 3,100,965 A * | 8/1963 | Blackburn | 60/375 |
| 3,608,311 A * | 9/1971 | Roesel, Jr. | 60/516 |
| 4,195,481 A * | 4/1980 | Gregory | 60/516 |
| 4,220,003 A * | 9/1980 | Doi | 60/325 |
| 4,674,281 A | 6/1987 | Kim et al. | |
| 4,718,232 A | 1/1988 | Willmouth | |
| 4,720,976 A | 1/1988 | Kim et al. | |
| 6,769,253 B1 | 8/2004 | Scharfenberg | |
| 2006/0064975 A1 | 3/2006 | Takeuchi | |
| 2006/0267346 A1 | 11/2006 | Chen | |
| 2008/0265581 A1 | 10/2008 | Welch | |
| 2010/1720242 | 7/2010 | Irps | |

* cited by examiner

*Primary Examiner* — Thomas Denion
*Assistant Examiner* — Christopher Jetton
(74) *Attorney, Agent, or Firm* — Beaumont Gitlin Tashjian; Larry F. Gitlin

(57) ABSTRACT

An apparatus comprising the use of at least two or more vertically disposed tubular structures with each tube filled with water, and having a nozzle-like conduit at one end. Inside each tube is a sealed cylinder or float for containing either gas or water. When gas is introduced into the float positioned at the bottom of the tube, the float begins to ascend inside the tube causing the water advancing ahead of the rising float to become increasingly more pressurized due to the buoyancy effect. Maximum or near maximum pressure levels are reached when the water advancing ahead of the rising float reaches the top of the tube and is forced through the narrow conduit and the interconnected flow line. At the top, the gas in the float is replaced with water compelling the float to sink to or near the bottom of the tube where the water is replaced with gas, and the process is repeated. The coordinated ascending and descending float in their respective tubes with one gas-filled float rising within its tube while simultaneously the other water-filled float sinks within another tube, or more typically a plurality of floats and tubes constructed and operating essentially in the same way, continuously repeat this process forcing a constant flow of highly pressurized water through the system eventually striking the turbine blades to rotate the generator shaft and produce the requisite hydroelectric power.

10 Claims, 9 Drawing Sheets

SYSTEM FOR BUOYANCY POWER GENERATION

This is a continuation-in-part of application Ser. No. 12/924,975 filed Oct. 12, 2010, now abandoned.

BACKGROUND OF THE INVENTION

1. Field of the Invention

This invention relates generally to an apparatus for producing hydroelectric power with the use of a hydroelectric turbine generator and more particularly to a new and improved apparatus that utilizes the physics of buoyancy and gravity to pressurize water to produce power.

2. Description of the Prior Art

The use of technology to move water to produce electric energy, such as falling water flowing through a dam used to turn a turbine propeller, which turns a shaft in a generator which, in turn, produces electric power, is well known in the prior art. Prior art systems in this area include, for example, the following: U.S. Pat. App. No. 2008/0265581A1 (Welch, et al., publication date Oct. 3, 2008), which teaches the use of a system of buoyancy pump devices driven by waves and currents to produce electricity. One embodiment converts wave motion into mechanical power, while another generates electricity from a turbine as a function of wave energy; U.S. Pat. App. No. 2006/0064975 A1 (Takeuchi, published Mar. 30, 2006), which teaches the introduction of continuous bubbled gas moving through a liquid to force a conveyor fitted with numerous bucket-like devices to rotate which in turn causes a power generating turbine to rotate; U.S. Pat. App. No. 2006/0267346A1 (Chen, published Nov. 3, 2006), which teaches the use of a water tower that accumulates water at the top through the application of buoyancy and the use of transmission rods to force the water up whereupon, guided by the principles of gravity, water cascades down a pipe to drive a turbine to produce the electric power; U.S. Pat. No. 6,769,253 B1 (Scharfenberg, issued Aug. 3, 2004), which teaches a turbine power plant using buoyant force in the form of air propelled against a series of vanes coupled to a shaft connected to a turbine; U.S. Pat. App. No. 2010/01720242 A1 (Irps, published Jul. 8, 2010), which teaches springs as an energy storage device connected to buoys driven up and down inside water-filled containers as a result of buoyance and gravitational forces exerted via a working stroke to produce mechanical energy to generate power; U.S. Pat. No. 4,720,976 (Kim, et al., issued Jan. 26, 1988), which teaches a method and apparatus for generating power comprising float members disposed inside respective cylinders and a series of lever arms pivotably disposed above the cylinders connected to the float members whereby water introduced and discharged into and from the cylinders causes the floats to rise and fall causing, in turn, the lever arms to pivot on their axes resulting in the conversion of rotational motion to rectilinear motion, or vice versa, to operate power generators or turbines; U.S. Pat. No. 4,718,232 (Willmouth, issued Jan. 12, 1998), which teaches an apparatus that drives an electrical power generator from a combination of buoyance and gravitational forces comprising a long chain having a series of attached float members extending around a sprocket with the float members immersed in liquid as they rise driven by the force of buoyance and passing through airspace as they fall pulled down by the force of gravity; and U.S. Pat. No. 4,674,281 (Kim, et al., issued Jun. 23, 1987), which teaches an apparatus for generating power comprising two cylinders and a float member within each cylinder and rotating lever arms attached to the float members at one end to a crank connected to a shaft at the other end whereby the introduction of fluid and air into the first cylinder and its float member, respectively, and simultaneously, the discharge of fluid and air from the second cylinder and its float member, respectively, cause the float members to rise and fall accordingly and, in turn, the lever arms to move up and down and the crank to rotate about the crank shaft.

The improved buoyancy power generating apparatus of the present invention comprises at least two vertically oriented tubes filled with liquid, preferably water, with one end of each tube having an inward tapered portion through which passes highly pressurized water. A float device, which has a diameter slightly less than the interior diameter of the tube and a conical-shaped bottom, is disposed inside each tube, with each float device capable of holding both gaseous and liquid material. Also included is the means for alternatively introducing and releasing gas and liquid to and from the float devices to cause one float to rise and fall within one tube, and a conical-shaped bottom, and simultaneously the other float to fall and rise within the other tube such that, when gas is introduced into one float, that float begins to rise within its tube, steadily increasing the water pressure ahead of it in the tube as the float ascends with the water reaching near or at its maximum pressure as it is forced through the tapered portion or nozzle formed at the top end of the tube. As the float filled with gas begins moving upwards within its tube, the float in a second tube, which begins its sequence at the top, is filled with liquid, typically water, causes it to sink to the bottom of the tube. The pressurized water moving through the nozzle and the line leading to the turbine eventually causes the turbine blades and, thus, the turbine to rotate. This, in turn, causes the generator shaft to rotate, which ultimately produces the electric power.

Nothing in the prior art, including the cited references above, includes an apparatus with the combination of structural elements and relationship of components, and the specific means and objectives as the improved apparatus of the present invention.

SUMMARY OF THE INVENTION

The apparatus of the present invention, which is based on the physics of buoyancy and gravity for generating hydroelectric power, comprises the use of at least two or more generally vertically disposed tubular structures, each tube filled with some type of liquid, preferably water, and having an inwardly tapered end forming a nozzle-like structure. Inside each tube is a cylinder or float member into which is introduced either a gas, such as air or helium, or a liquid, such as water. When gas is introduced into the float member as it sits on at or near the bottom of the tube, the float member begins to ascend inside the tube causing, in turn, the water inside the tubular member ahead of the rising float to become increasingly more pressurized due directly to the effect of the float's buoyancy. Maximum pressure is reached when the water advancing ahead of the rising float reaches the top of the tube and is forced through the narrow conduit of the nozzle. The gas in the float member is then replaced with liquid, usually water, causing the float member to sink to or near the bottom of the tube where the water is replaced with gas, and the process is repeated. The introduction and release of the water and gas in each float member within their respective tubes is achieved through the use of a series of computer-assisted power or manually operated conventional pumps and valves utilized specifically for this purpose. The alternating float members in their respective tubes with one gas-filled float rising while simultaneously the other water-filled float sinks, or more typically a plurality of floats and tubes constructed and operating this same way, continuously repeat this process forcing at a constant rate pressurized water against the turbine blades, which rotate the generator shaft to produce the requisite hydroelectric power.

Accordingly, the object of the present invention is to provide a new and improved apparatus for the production of hydroelectric power.

Still another object of the present invention is to provide a new and improved apparatus for the production of hydroelectric power utilizing the injection of controlled highly pressurized water into a turbine to power a generator.

Still another object of the present invention is to provide a new and improved apparatus for the production of hydroelectric power utilizing the combined application of the principles of buoyancy and gravity.

Still another object of the present invention is to provide a new and improved apparatus for the production of hydroelectric power that utilizes multiple water filled tubular structures with closed cylinders inside each tubular structure containing ether gas, which causes the cylinder to rise at an accelerated pace to the top of the tube forcing steadily increasing pressurized water ahead of it as it ascends, or water, to cause the cylinder to descend to the bottom of the tube.

Still another object of the present invention is to provide a new and improved apparatus for the production of hydroelectric power utilizing the combined application of the principles of buoyancy and gravity, which is easy to install, operate and maintain Still another object of the present invention is to provide a new and improved apparatus for the production of hydroelectric power utilizing the combined application of the principles of buoyancy and gravity, which is easy and cost effective to manufacture.

The features of this invention, which are believed to be novel and non-obvious, are set forth with particularity in the appended claims. The present invention, both as its organization and manner of operation, together with further objects and advantages thereof, may be best understood by reference to the following detailed description, taken in conjunction with the accompanying drawings.

DETAILED DESCRIPTION OF THE PREFERRED EMBODIMENT

Figure 1:
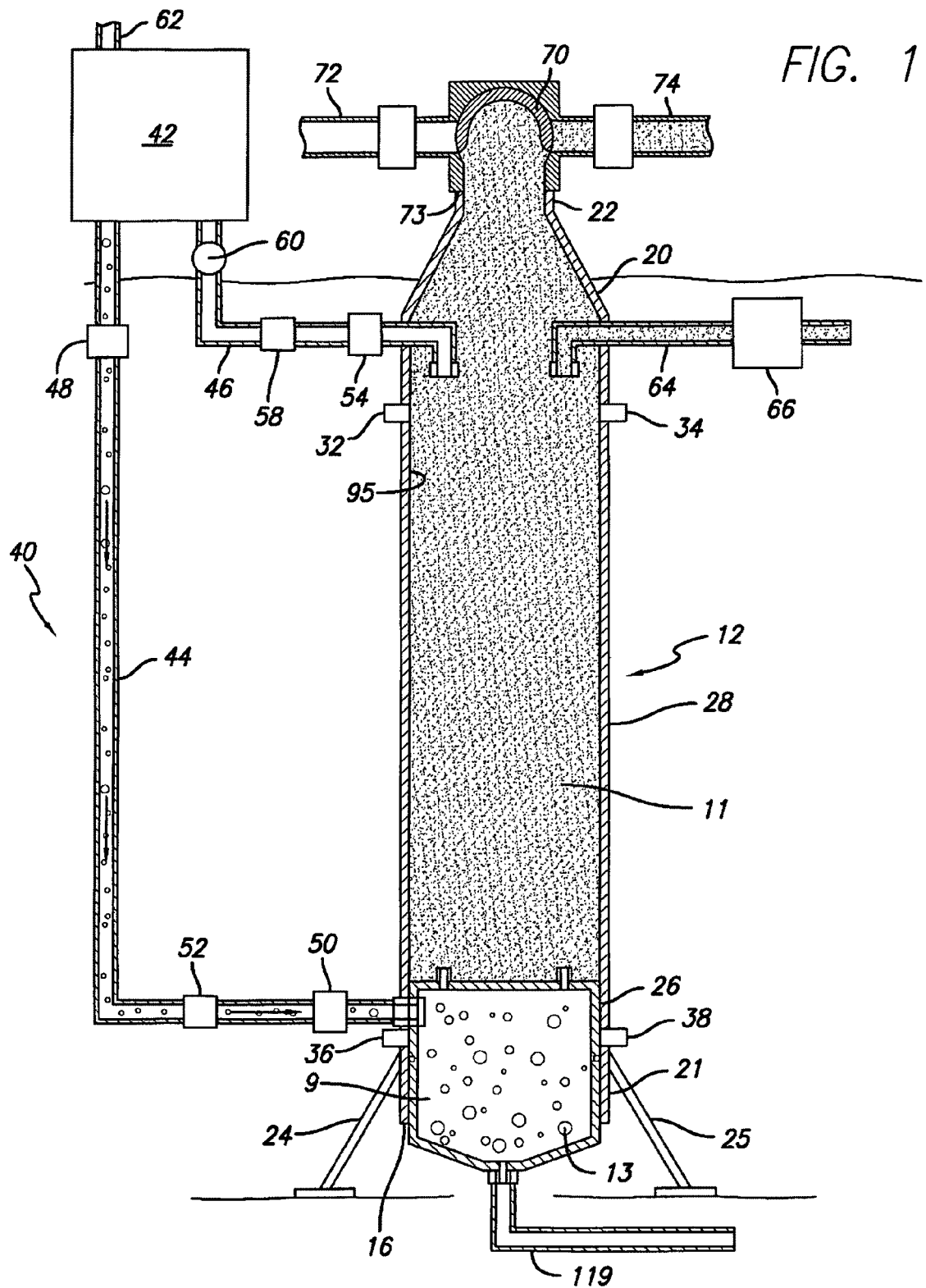
FIG. 1 is a cross section elevational view of a single tube apparatus in accordance with the present invention.

The present invention consists of an apparatus for the production of hydroelectric power comprised of two or more generally vertically disposed tubular members, such as tubular member 12 shown in FIG. 1, with each tubular member 12 being filled with any suitable liquid, such as, for example, fresh or salt water 11. Tubular member 12 has a base 16 which forms an opening 18 to enable the unobstructed entry and discharge of water 11 into and out of tubular member 12, respectively. The source of water 11 can be any suitable large body of water, such as, for example, an ocean, river or lake. Formed at the top 20 of tubular member 12 is a nozzle-like conduit section 22. Tubular member 12 employs any conventional structural support, such as support members 24 and 25 adjacent opening 18, to provide suitable support and stability to tubular member 12 in particular and to the overall apparatus generally.

Inside tubular member 12 is float member 26, which contains a tank compartment 9 for holding gaseous material 13, such as, for example, air or helium, and liquid material, such as, for example, water 15. Mounted on the exterior wall 28 of tubular member 12 and projecting through the interior wall 95, positioned near, but below, top 20, and near, but just above, bottom 21, are brake units 32 and 34, and 36 and 38, respectively. Brake units 32, 34, 36 and 38 are operated using any suitable mechanically or electrically operated power sources, computer-assisted or otherwise (not shown), are used to engage and secure float member 26, when it reaches its predetermined positions at or near top 20 or bottom 21 of tubular member 12. Electrical power sources include, without limitation, hydro, solar, wind turbine, nuclear and geothermal, which may be located off-site. Emergency on-site power sources may comprise diesel generators or an uninterruptible power source supplied, for example, by batteries.

Situated adjacent and partially integrated into exterior wall 28 of tubular member 12 is assembly 40 consisting of pressurized gas supply tank 42 for containing pressurized gas 13, including, without limitation, helium or air, and flow lines 44 and 46, respectively, for use in introducing gas 13 into tank 9 when float member 26 is positioned at bottom 21 of tubular member 12 and discharging gas 13 from tank 9, when float member 26 is positioned at top 20 of tubular member 12. Flow line 44 includes check valves 48 and 50 and regulating valve 52. Flow line 46 includes check valve 54, moisture separator 58 for purging moisture from gas 13 and compressor 60 to compress gas 13 before it reenters pressurized gas supply tank 42. Flow line 62 is also provided to resupply pressurized gas supply tank 42 from any suitable outside source. Check valves 48, 50, and 54 and regulating valves 52 are provided to control the flow of gas 13 to and from tank 9 of float member 26. Also integrated into exterior wall 28 of tubular member 12 is flow line 64 for introducing fresh or salt water into tank 9 of float member 26 with the assistance of water pump 66. Flow line 119 situated just below bottom 21 of tubular member 12 is used for carrying and discharging displaced water 15 from tank 9 into an ocean, lake, river, or any other suitable body of water. Valves 48, 50, 52 and 54, moisture separator 58, compressor 60 and water pump 66 can be mechanically or electrically operated using any suitable power source, computer-assisted or otherwise (not shown). Check valves 48, 50 and 54 may also be selfactuated. Electrical power sources include, without limitation, hydro, solar, wind turbine, nuclear and geothermal, which may be located off-site. Emergency on-site power sources may comprise diesel generators or an uninterruptible power source supplied, for example, by batteries.

At or near the tip of conduit 22 is a 3-way control valve 70 connected on either side to flow lines 72 and 74 which lead to and return from turbine 76, respectively. Check valves 78 and 82, which may be self-actuated, are incorporated into flow lines 72 and 74, respectively, to control the flow of pressurized water 11 leading to and returning from turbine 76. Conventional in design, turbine 76 includes any suitable shaft 77 and a series of connected conventional turbine blades 79. Water 11 flowing through discharge line 72 against the turbine blades compels the shaft to rotate which, in turn, causes the generator 80, also of conventional design, to turn and produce the desired amount of hydroelectric power. Control valve 70 and check valves 78 and 82 can be mechanically or electrically operated using any suitable power source, computer-assisted or otherwise (not shown). Electrical power sources include, without limitation, hydro, solar, wind turbine, nuclear and geothermal, which may be located off-site. Emergency on-site power sources may comprise diesel generators or an uninterruptible power source supplied, for example, by batteries.

Figure 3:
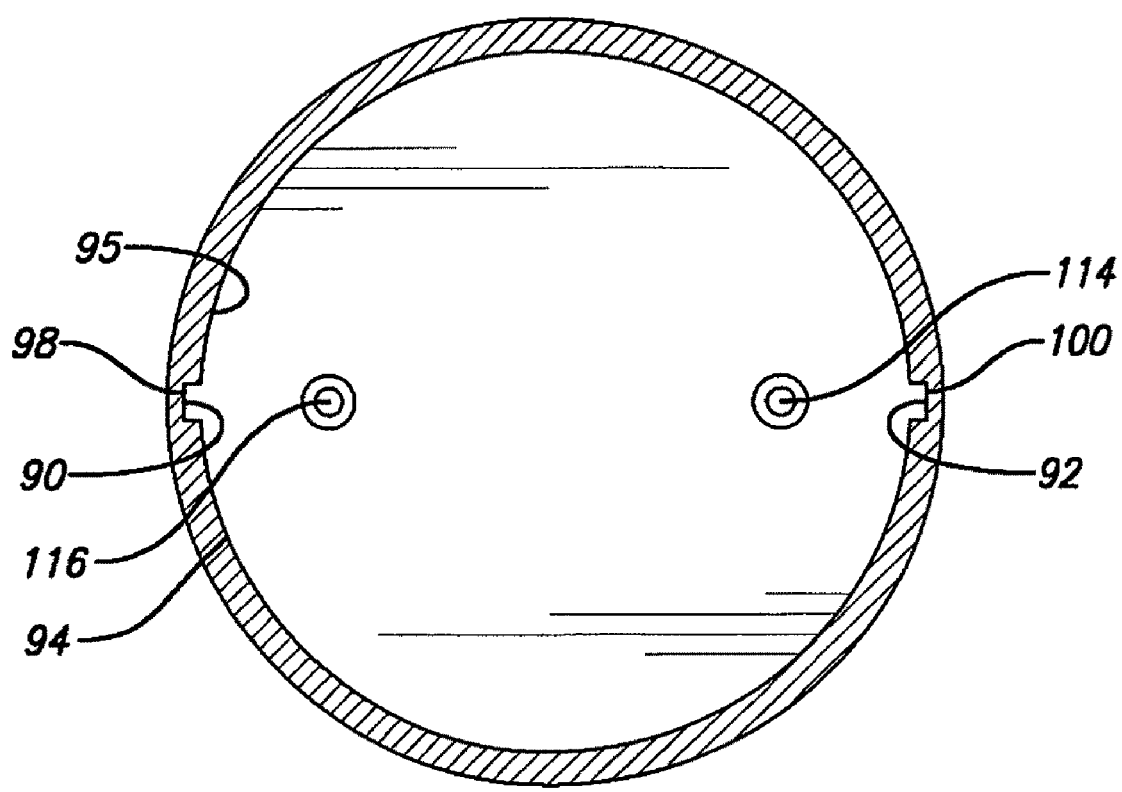
FIG. 3 is a cross sectional view of a single tube apparatus in accordance with the present invention shown along lines 3-3 of FIG. 2.
Figure 4:
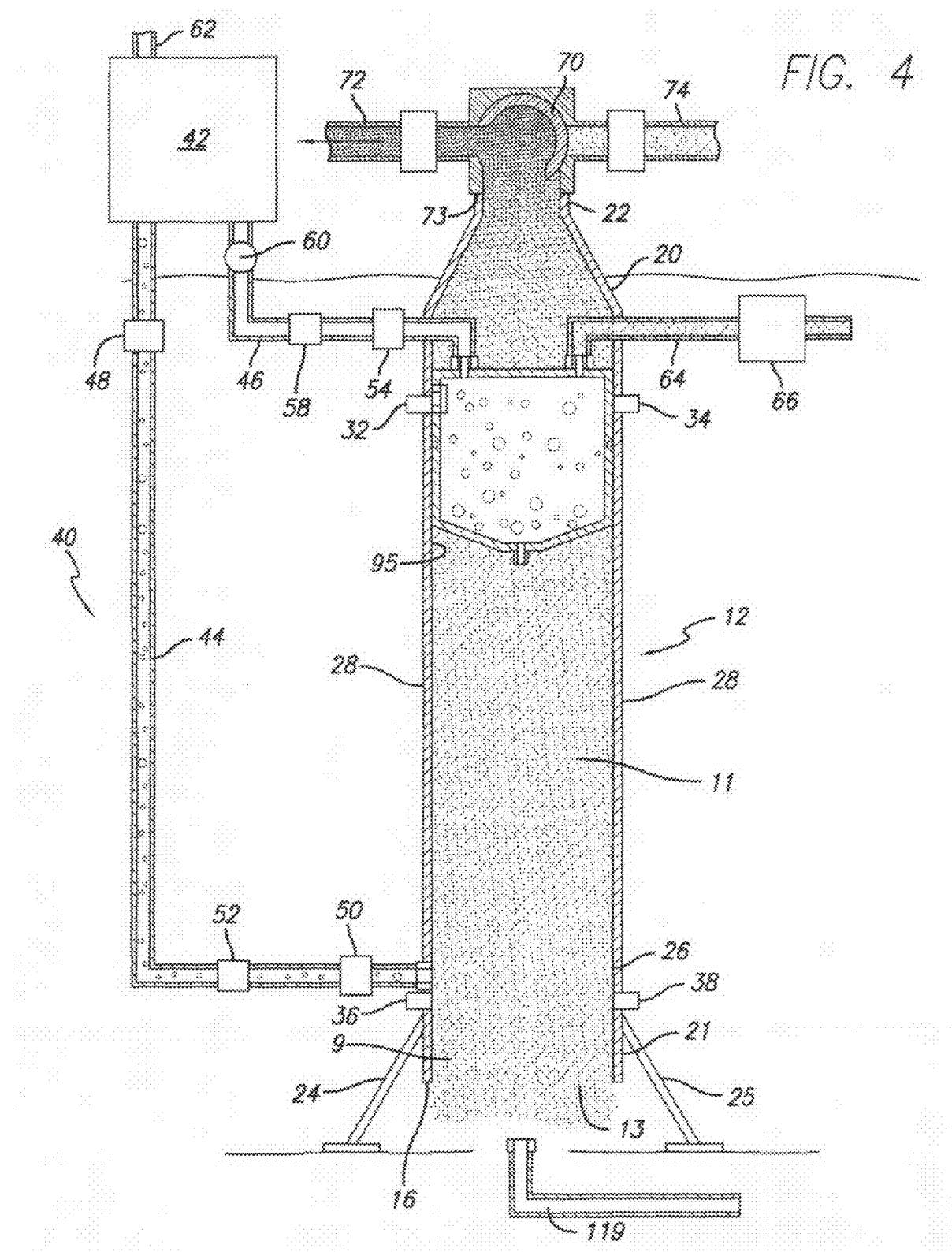
FIG. 4 is a cross section elevational view of a single tube apparatus in accordance with the present invention showing the float component at the end of its ascent inside the tube member.

Float member 26 includes rails 90 and 92 formed along and typically on opposite sides of exterior wall 94 of float member 26 (FIG. 3). Notched into the interior side wall 95 of tubular member 12 are channels 98 and 100, which mate with guide rails 90 and 92, respectively, to ensure that, as float member 26 rises and falls within tubular member 12, it remains stable and operates with a smooth and unrestrained motion. Float member 26 has top wall 110 and bottom wall 112, which is preferably conical in shape to allow the discharge of water 15 to occur more easily at a faster rate.

Figure 5:
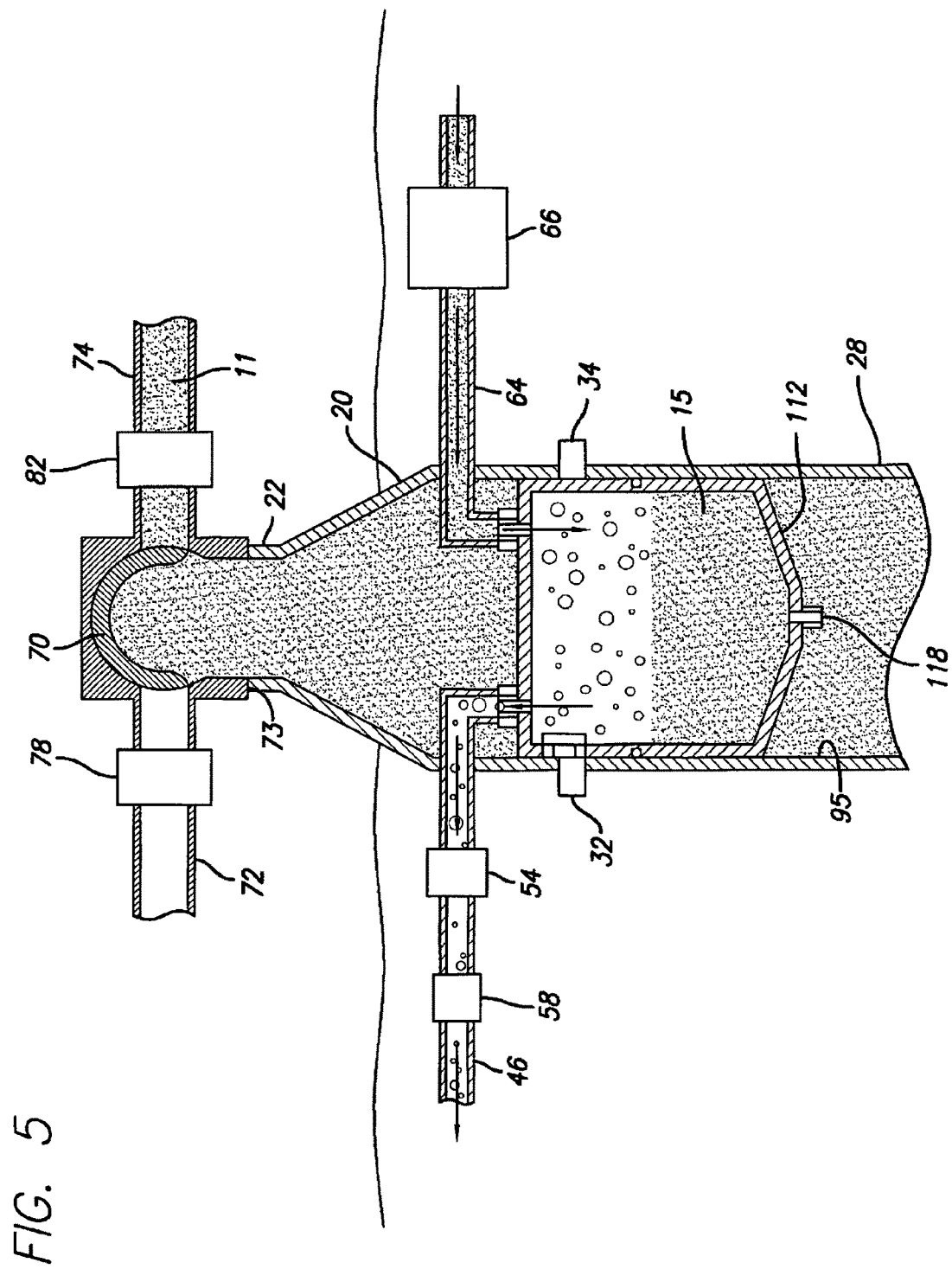
FIG. 5 is a cross-sectional view of a section of a single tube apparatus in accordance with the present invention showing water being introduced into the float component and the concurrent displacement of gas therefrom.

Formed within top wall 110 are two conventional flow valves 114 and 116 which, when float member 26 is in its predetermined positioned at top 20 of tubular member 12 (see FIG. 5), are mated with valves 123 and 125 formed at the ends of flow lines 46 and 64, respectively. When joined, valves 116 and 123 are opened to allow tank 9 to depressurize and gas 13 to be discharged from tank 9 through flow line 46 into gas supply tank 42. Valves 114 and 125, after joining, are then opened to allow the introduction of fresh or salt water 15 into tank 9. After tank 9 has been completely filled with water 11 and all remnants of gas 13 have been removed, valves 114 and 116, and 123 and 125 are closed and sealed in coordination. Valves 114, 116, 123 and 125 can be mechanically or electrically operated using any suitable power source, computer-assisted or otherwise (not shown). Electrical power sources include, without limitation, hydro, solar, wind turbine, nuclear and geothermal, which may be located off-site. Emergency on-site power sources may comprise diesel generators or an uninterruptible power source supplied, for example, by batteries.

When float member 26 is positioned at bottom 21 of tubular member 12, valve 118, which is formed within bottom wall 112 of float member 26, typically at or near the midpoint of bottom wall 112, and which is also mated to valve 121, is opened to allow liquid 15 inside tank 9 to flow (gravity assisted) downwards through flow line 119 and eventually out flow line 119 into the ocean, lake, etc. Concurrently, valve 115 formed within side wall 111 of float member 26 mates with valve 113 formed at one end of flow line 44. When valves 113 and 115 are joined, they open concurrently to allow for the introduction of gas 13 into tank 9. In the process, gas 13 entering tank 9 displaces liquid 15, forcing water 15 down and through flow line 119. Valves 113, 115, 118 and 121 can be mechanically or electrically operated using any suitable power source, computer-assisted or otherwise (not shown). Electrical power sources include, without limitation, hydro, solar, wind turbine, nuclear and geothermal, which may be located off-site. Emergency on-site power sources may comprise diesel generators or an uninterruptible power source supplied, for example, by batteries.

Figure 2:
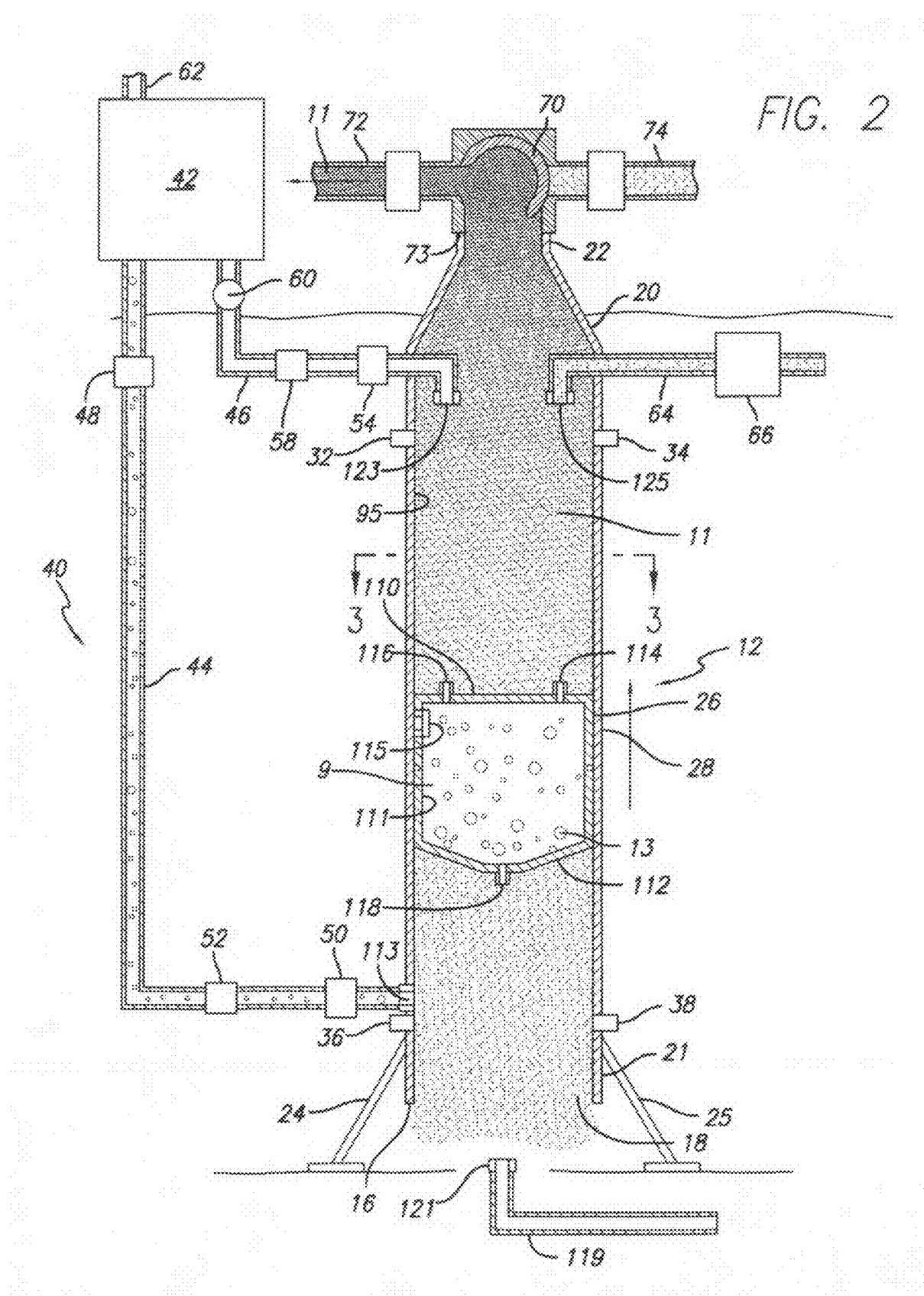
FIG. 2 is a cross section elevational view of a single tube apparatus in accordance with the present invention showing the float component ascending in the tube member.

In a typical application of the apparatus of the present invention, float member 26 is positioned at bottom 21 of tubular member 12. Tank 9 is filled with gas 13 introduced through flow line 44 from pressurized gas supply tank 42 until all water 15 inside tank 9 has been completely displaced and discharged from the system. Mechanically or electrically operated valves 113, 115, 118 and 121 are closed and sealed and mechanically or electrically operated control valve 70 is opened to allow water 11 to flow to the turbine 76. Mechanically or electrically operated brakes 36 and 38 are then disengaged allowing float member 26 to begin to ascend steadily within tubular member 12 (see FIG. 2). As float member 26 continues to rise within the water filled tubular member 12, the portion of water 11 moving ahead of or immediately above float member 26 as it rises steadily builds in pressure (see FIG. 2). The close distance between exterior wall 94 of float member 26 and interior sidewall 95 of tubular member 12 helps to seal these two adjacent areas, which aids in maintaining, if not increasing, the pressure build up of water 11 as it flows in advance of ascending float member 26. To assist even more in this regard, an O-ring, gasket or some other similar device (not shown) may be utilized to improve the seal and enhance the increase in pressure and overall buoyancy effect.

When float member 26 reaches a predetermined position at top 20 of tubular member 12, and immediately before mechanically or electrically operated valves 114 and 116 are opened and water 15 begins to flow into and gas 13 is displaced from tank 9, water 11 flowing in advance of ascending float member 26 continues to flow with a steady build up of pressure. This pressurized water 11 continues to flow through the narrowed area 73 formed just below the section defined by control valve 70 into flow line 72 in the direction of turbine 76, where eventually pressurized water 11 collides with the turbine blades 79.

When float member 26 reaches the end of the sequence at or near top 20, mechanically or electronically operated valves 123 and 125 of flow lines 46 and 64 are joined with mechanically or electrically operated valves 116 and 114, respectively. Valves 123, 125, 116, and 114, in a coordinated manner, are then opened to enable water 15 to flow, with the assistance of mechanically or electrically operated pump 66, into interior tank 9 and gas 13 to be displaced from inside tank 9 and then returned through flow line 46 to pressurized gas supply tank 42.

Figure 6:
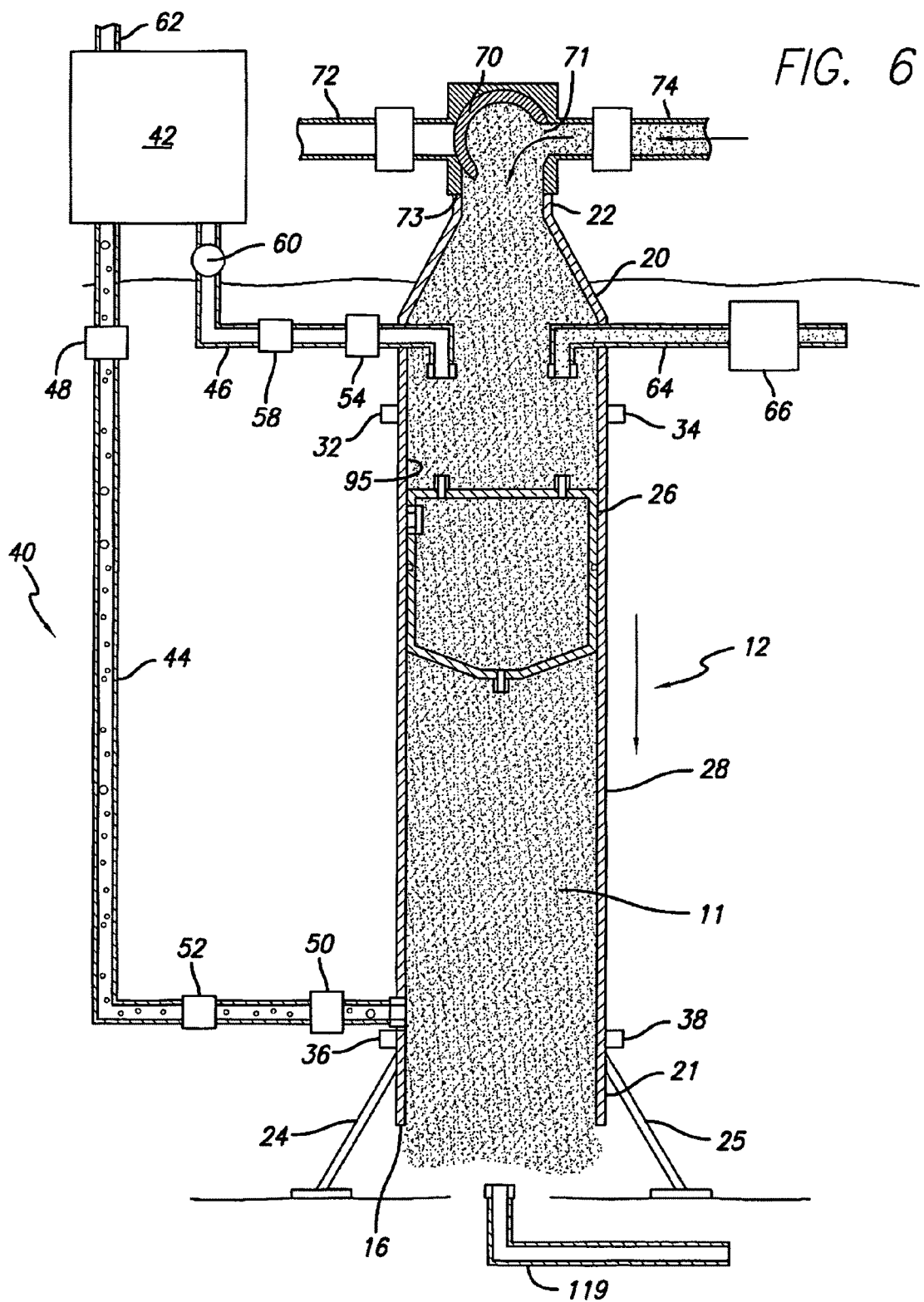
FIG. 6 is a cross-sectional view of a single tube apparatus in accordance with the present invention showing the water-filled float component in a descending mode.
Figure 7:
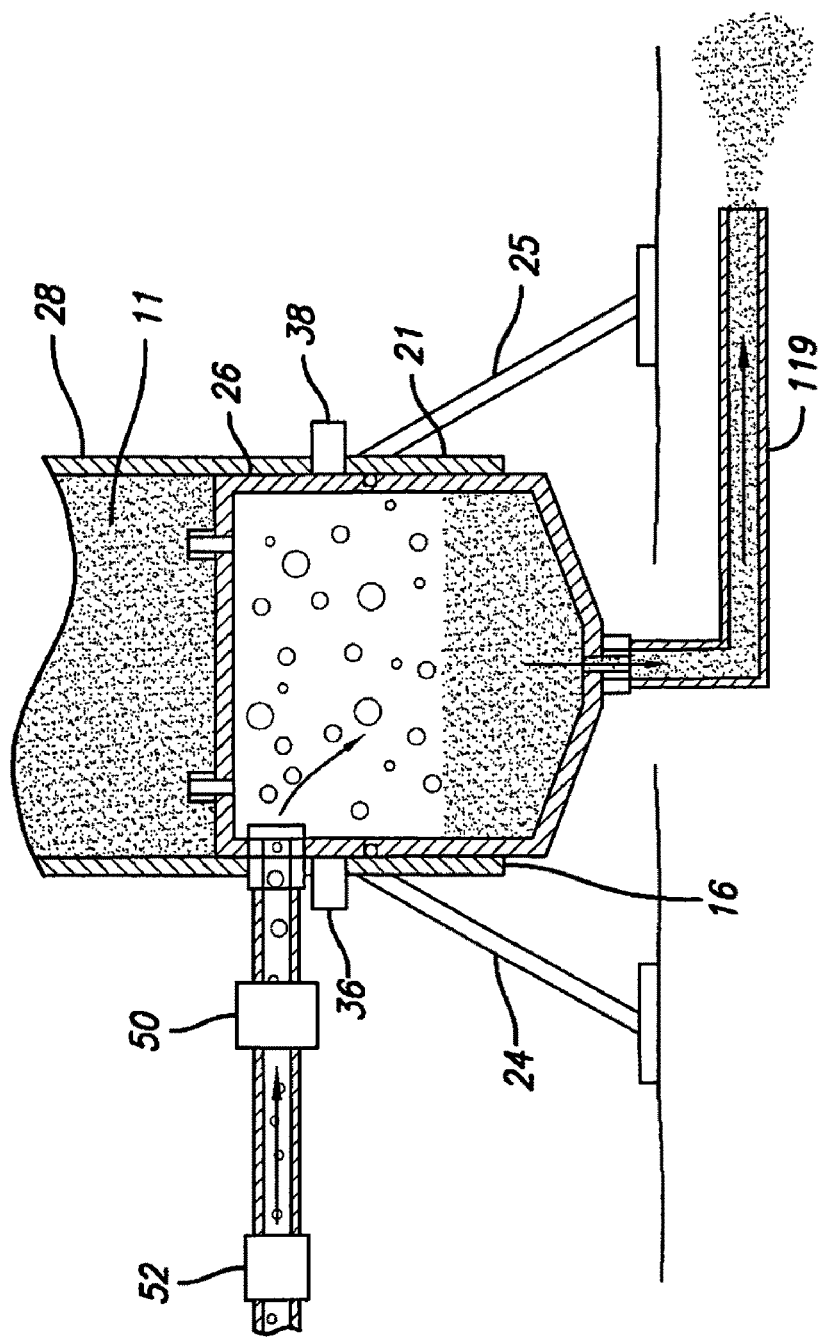
FIG. 7 is a cross-sectional view of the bottom section of a single tube apparatus in accordance with the present invention showing gas being introduced into the float component and the concurrent displacement of water therefrom.

Just prior to the coordinated opening of valves 114 and 116, and 123 and 125, control valve 70 remains open to enable the continuous flow of pressurized water 11 in the direction of turbine 76. As valves 114, 116, 123 and 125 begin to open, control valve 70 is closed (FIG. 5), cutting off the flow of water 11 in all directions. When water 15 has completely filled tank 9 displacing gas 13, valves 114 and 116, and valves 123 and 125 are closed and sealed. Mechanically or electrically operated brakes 32 and 34 then disengage and float member 26 begins to descend (see FIG. 6). Concurrently, control valve 70 is opened at one end 71 to enable the return of water 11 through flow line 74. The flow of water 11 from that direction also assists in compelling float member 26 towards its predetermined stopping point at bottom 21. When float member 26 reaches its predetermined position at bottom 21, brakes 36 and 38 are engaged to halt float member 26 from descending further. Valves 118 and 121 are joined, and then opened. Valves 113 and 115 are also joined, and then opened, whereupon gas 13 is introduced into tank 9, displacing, with the assistance of gravity, water 15 from inside tank 9 into and through discharge flow line 119 out to the ocean, lake or some other suitable body of water, which is also the supply source of water 11 that enters tubular member 12 through opening 18.

Figure 8:
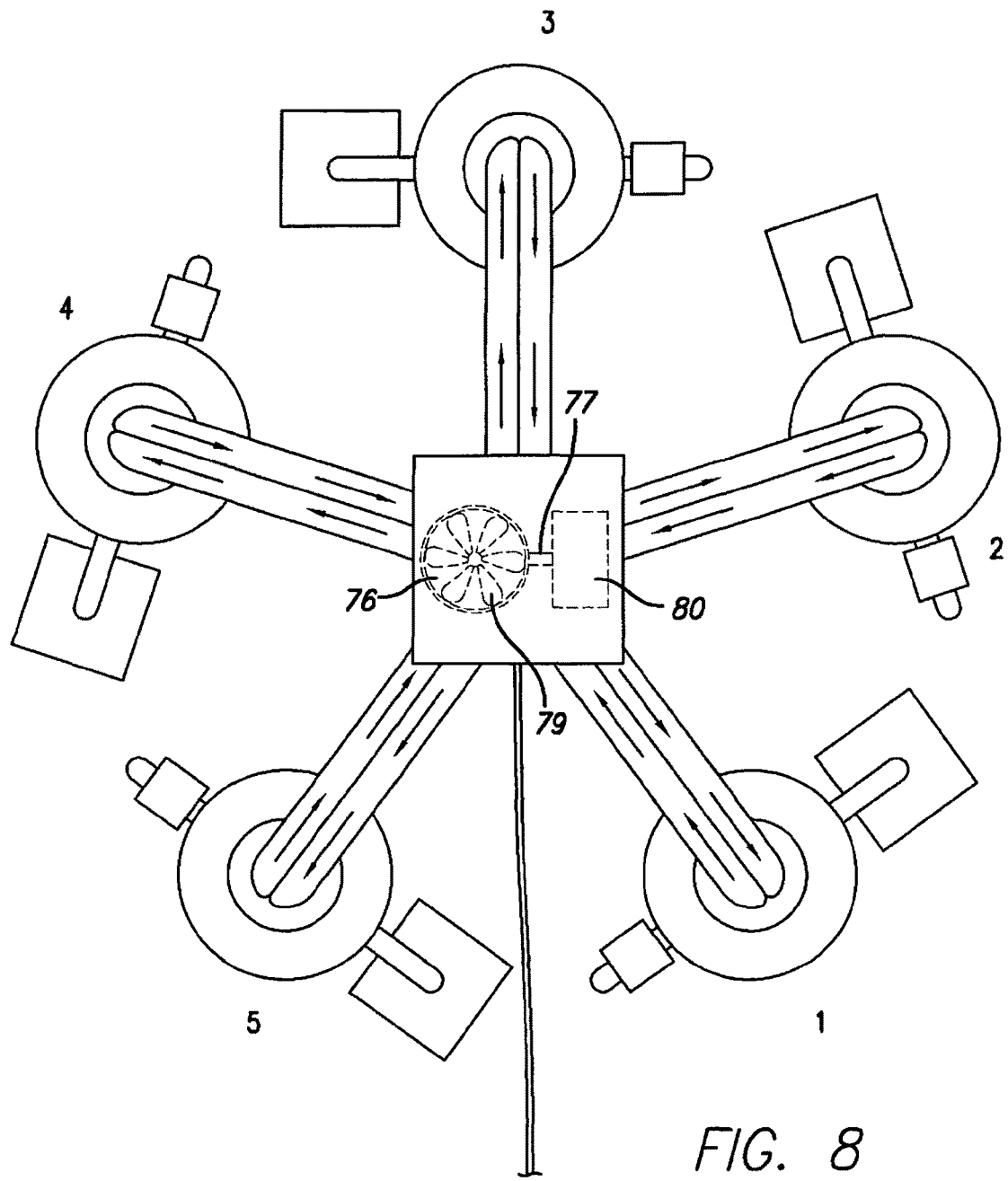
FIG. 8 is a plan view of an assembly of single tube apparatuses in accordance with the present invention interconnecting with a common turbine and power generator.
Figure 9:
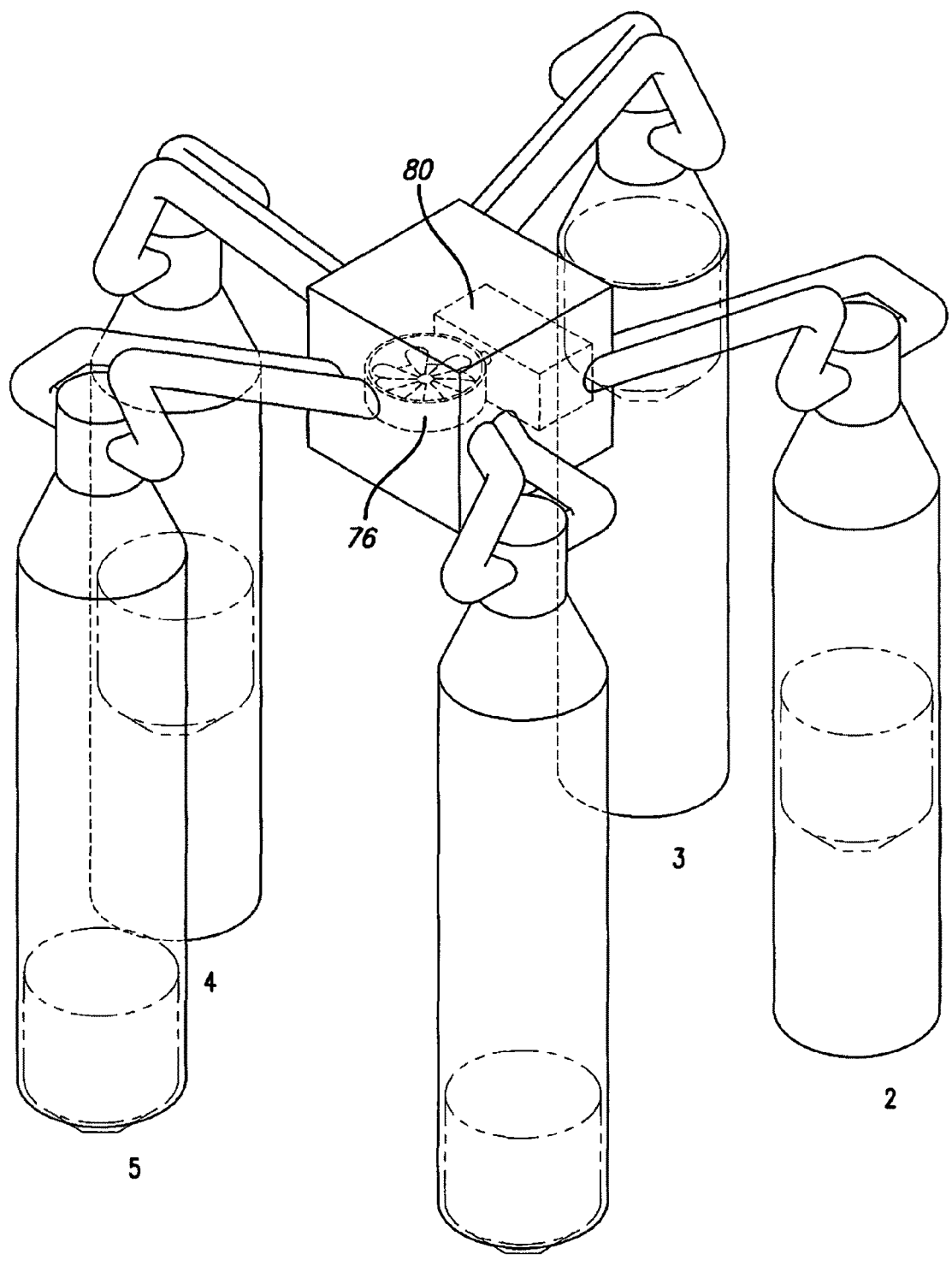
FIG. 9 is a perspective view of an assembly five (5) of single tube apparatuses in accordance with the present invention.

The overall objective of the apparatus of the present invention is to utilize a combination of individual units, by way of example only, five (5) or more (See FIGS. 8 and 9), each consisting of a tubular member 12 and a float member 26, along with the various other requisite components, as described, with the float members 26 rising and falling in their respective tubular members 12 in a coordinated sequence to maintain constant water pressure throughout the system forcing rotation of the turbine blades and the turbine shaft and, in turn, causing the generator to produce hydroelectric power.

The constant rise and fall of these floats in concert, as described here in detail, serves to maintain a continuous flow of highly pressurized water within the system to ensure the means to maintain a reliable power source.

Tank compartment 9 within float member 26 requires the capacity to accommodate a sufficient volume of gaseous material 13 to enable the displacement of water 11 advancing above it and float member 26 to rise at a constant rate accordingly. The relationship of gas volume to water weight necessary to enable these system components to operate effectively in accordance with the present invention determines their size and relative proportions.

The dimensions of each tubular member 12 will vary according to the electrical power requirements of the particular system employed. For example, with a tubular structure and a float inside comprising a single unit, to produce power for a single family residential structure might only require two or three such units along with the requisite turbine, generator and other components to complete the system. The dimensions of a tubular member for a system of this size might be in the range, for example, of three (3) to twelve (12) inches or possibly even several feet in diameter with the other components, including the return and discharge lines, the valves, the float members, and the turbine and the generator being sized commensurate with their respective functions and objectives. The greater the power required, for example, by communities within a city or a city itself, or even a larger geographical area, would demand system components on a much greater corresponding scale, perhaps even tubular members several feet in diameter, possibly as many as twelve feet or more, and height dimensions and the dimensions of all of the other components proportional to that, and the use of multiple units, likely a dozen or more, to ensure the system's full capability.

This invention has been described in its presently preferred embodiment, and it is clear that it is susceptible to numerous modifications, modes and embodiments within the ability of those skilled in the art and without the exercise of this inventive faculty.

The invention claimed is:

1. An apparatus for generating power, comprising
   a first tubular member and at least a second tubular member, each said first tubular member and said at least second tubular member being filled with liquid and having a tapered portion forming a conduit at one end;
   a first float member disposed within said first tubular member, said first float member being adapted for containing gas and liquid;
   a second float member disposed within said at least second tubular member, said second float member being adapted for containing gas and liquid;
   means for alternately introducing and discharging said gas and liquid into and from said first float member and said second float member, whereby when said gas is introduced into said first float member, said first float member is caused to ascend within said first tubular member causing the pressure of said liquid advancing ahead of said ascending first float member within said first tubular member to build as said first float member ascends, said advancing liquid reaching maximum or near maximum pressure levels as said advancing liquid is forced through and beyond said conduit, whereby when said liquid is introduced into said second float member, said second float member is caused to descend within said at least second tubular member;
   a turbine generator having means to rotate for producing power;
   said constant ascending and descending of said first and second float members in coordinated alternating relation within said first and said at least second tubular members compel said advancing liquid flowing through said conduit of each of said tubular members to act forcibly upon said means to rotate said turbine generator to produce power.

2. The apparatus of claim 1 having three or more tubular members, each of said tubular members having a float member.

3. The apparatus of claim 1 wherein said gas comprises air.

4. The apparatus of claim 1 wherein said gas comprises helium.

5. The apparatus of claim 1 wherein said liquid comprises water.

6. The apparatus of claim 1 wherein said gas contained in said first float member upon reaching its maximum height within said first tubular member is released and liquid is introduced in its place.

7. The apparatus of claim 1 wherein said liquid contained in said second float member upon reaching the bottom of said at least second tubular member is discharged from said second float member and gas is introduced in its place.

8. The apparatus of claim 1 wherein said means for alternately introducing and discharging said gas and liquid into and from said first float member and said second float member is power-assisted.

9. The apparatus of claim 8 wherein said power-assisted means derives from an energy source from the group comprising solar energy, hydroelectric energy, wind turbine energy, nuclear energy and geothermal energy.

10. The apparatus of claim 1 wherein said means for alternately introducing and discharging said gas and liquid into and from said first float member and said second float member is mechanical.

* * * * *